United States Patent

Drennen

[11] Patent Number: 5,330,040
[45] Date of Patent: Jul. 19, 1994

[54] RINGED COVER AND SEAL FOR A VISCOUS FLUID CLUTCH AND METHOD OF MAKING

[75] Inventor: David B. Drennen, Bellbrook, Ohio

[73] Assignee: General Motors Corporation, Detroit, Mich.

[21] Appl. No.: 956,231

[22] Filed: Oct. 5, 1992

[51] Int. Cl.$^5$ ............................................. F16D 35/02
[52] U.S. Cl. ................................. 192/58 B; 192/112; 192/113.23; 29/889.3; 416/169 A
[58] Field of Search .............. 192/58 B, 112, 113 AC, 192/113 AD, 113 AL; 29/889, 889.23, 889.3, 889.5; 416/169 A

[56] References Cited

U.S. PATENT DOCUMENTS

| | | | |
|---|---|---|---|
| 3,053,363 | 9/1962 | Weir | 192/58 B |
| 3,055,473 | 9/1962 | Oldberg et al. | 192/58 B |
| 3,059,745 | 10/1962 | Tauschek | 192/58 B |
| 3,075,691 | 1/1963 | Kelley . | |
| 3,250,355 | 5/1966 | Weir | 192/58 B |
| 3,272,292 | 9/1966 | Sutaruk | 192/58 B |
| 3,318,526 | 5/1967 | Mobius | 236/35 |
| 3,727,593 | 4/1973 | Enke | 123/41.12 |
| 3,993,415 | 11/1976 | Hauser | 416/93 R |
| 4,181,172 | 1/1980 | Longhouse | 165/51 |
| 4,181,205 | 1/1980 | Mennucci et al. | 192/58 B |
| 4,444,300 | 4/1984 | Hayashi et al. | 192/58 B |
| 4,630,721 | 12/1986 | Johnston et al. | 192/58 B |

*Primary Examiner*—Richard M. Lorence
*Attorney, Agent, or Firm*—A. Michael Tucker

[57] ABSTRACT

A viscous fluid clutch includes a cover having an airflow ring. The airflow ring can be formed integrally with or separately from the cover. Concentric inner and outer walls are attached to each other by radially spaced fins. A cooling passage for airflow is provided between each pair of adjacent fins. During rotation, a cooling airflow passes freely between the fins, improving the rate of heat transfer from the clutch. Such construction of the walls and fins and a method for forming the cover are well suited for casting and eliminate the need for costly prior art machining. A labyrinth seal can be formed between the cover and housing by an annular flange on the housing received into a complementary groove in the cover.

21 Claims, 3 Drawing Sheets

RINGED COVER AND SEAL FOR A VISCOUS FLUID CLUTCH AND METHOD OF MAKING

BACKGROUND OF THE INVENTION

1. Field of the Invention

The present invention relates generally to a viscous fluid drive device. In particular, the present invention is concerned with an airflow ring for a cover of a viscous fluid clutch.

2. Description of the Related Art

A viscous fluid coupling for controlling the speed of an engine cooling fan is well-known. Generally, the coupling includes a rotatable housing defining an axis of rotation. A cover is attached to the housing to form a closed interior volume divided by a plate into a working chamber and a fluid reservoir. A driven clutch plate is disposed in the working chamber and is rotatable relative to the housing. A shear zone is formed between the clutch plate and the housing. When fluid from the reservoir is introduced to the shear zone, fluid shear transmits torque from the clutch plate to the housing, thereby rotating the housing and an attached fan to provide a flow of cooling air into the engine compartment.

Fluid friction and shear in the shear zone result in high temperatures and heat build-up inside the coupling. Persons skilled in the art are well aware of the adverse effects such heat can have on a clutch and its viscous fluid. The use of fins on the outer surfaces of the housing and the cover are widely used to dissipate this heat.

The art continues to seek improvements. It is desirable to provide efficient transfer of heat from a shear zone of a viscous fluid clutch, thereby improving the operation and life of the device.

SUMMARY OF THE INVENTION

The present invention includes an airflow ring for a cover of a viscous fluid clutch. The airflow ring can be formed integrally with or separately from the cover. Concentric inner and outer walls are attached to each other by radially spaced fins. A cooling passage for airflow is provided between each pair of adjacent fins. During rotation, a cooling airflow passes freely between the fins, improving the rate of heat transfer from the clutch. Such construction of the walls and fins lends itself well to casting and eliminates the need for costly prior art machining.

In a preferred embodiment, a viscous fluid coupling includes a housing and a cover cooperating to form a hollow interior. A plate is mounted between the housing and cover to separate a fluid working chamber from a fluid reservoir. A clutch plate, mounted in the working chamber, is driven by a input shaft. A fluid shear zone is formed between the clutch plate and the housing. A plurality of fins are formed on an outer surface of the cover and bounded by an airflow ring. A cooling passage is formed between each adjacent pair of fins. The fins and airflow ring are preferably integrally formed, and can be integrally formed with the cover or separately formed as a module and adapted to be secured to the cover and housing.

DETAILED DESCRIPTION OF THE PREFERRED EMBODIMENTS

Figure 1:
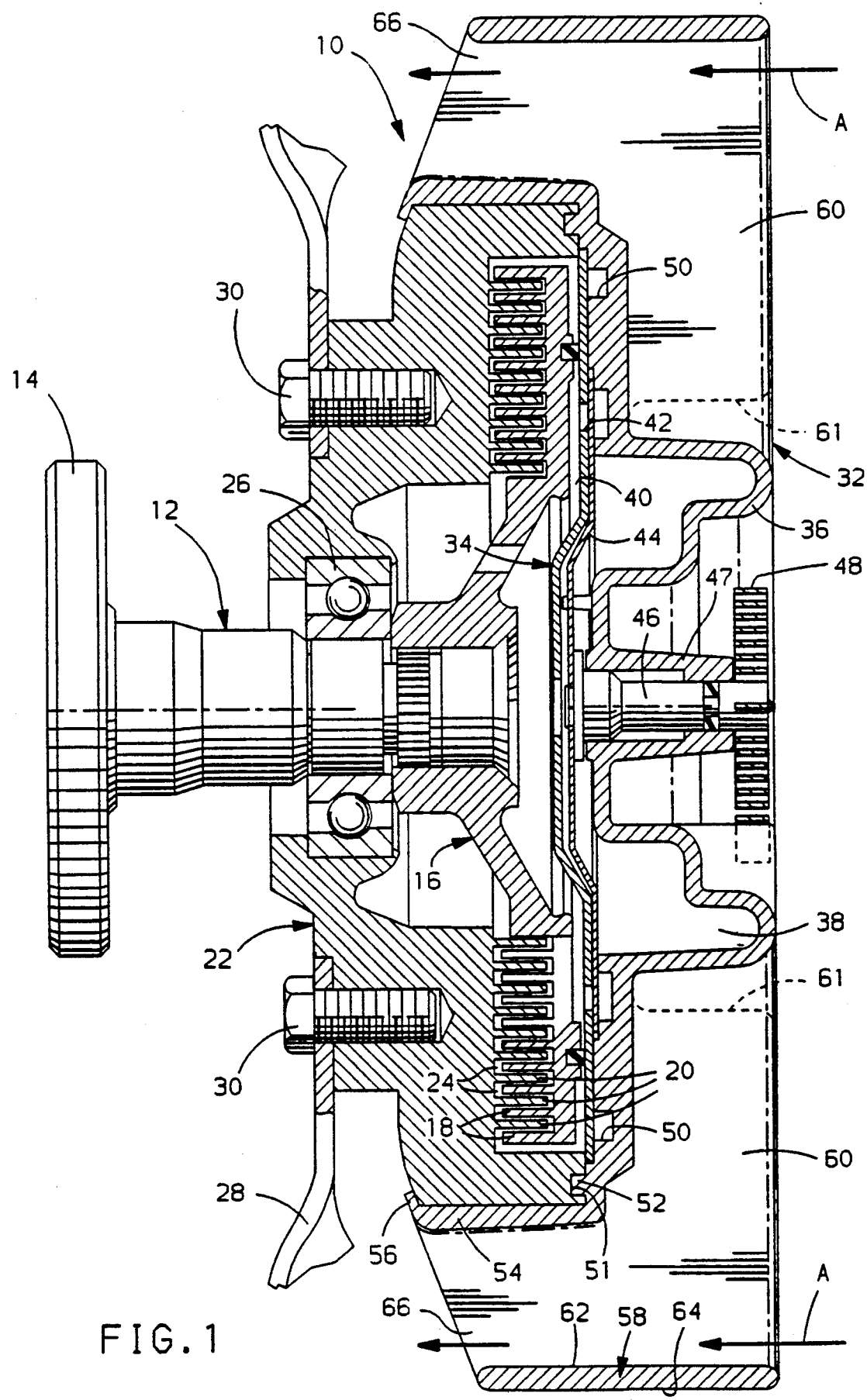
FIG. 1 is an axial sectional view of a viscous fluid clutch and attached fan incorporating a cover having an airflow ring according to the present invention.

A viscous fluid coupling or clutch indicated generally at 10 is illustrated in FIG. 1. The clutch 10 includes a rotatably driven input shaft indicated generally at 12. The input shaft 12, which can be provided with multiple steps as illustrated, preferably terminates at its first or innermost end in a flange 14. The flange 14 is typically secured to a conventional engine water pump (not illustrated) to drive the clutch 10 as described below.

The input shaft 12 is drivingly connected to a clutch plate 16. Annular lands 18 on the clutch plate 16 are interdigitated with annular lands 20 formed on an inner surface of a housing 22 to form a fluid shear zone 24. The housing 22 is rotatably mounted on the input shaft 12 by a bearing set 26. A fan 28 is secured to the housing 22 by threaded fasteners 30. Fluid shear in the shear zone 24 drives the housing 22 in a well-known manner.

A cover indicated generally at 32 is a bowl-like member secured to and cooperating with the housing 22 to form an interior volume divided by a pump plate 34. In FIG. 1, the portion of this volume to the right of the pump plate 34 bounded by an annular hub 36 formed in the cover 32 forms a fluid reservoir 38. The portion of the interior volume to the left of the pump plate 34 forms a fluid working chamber 40. The clutch plate 16 is rotatably disposed in the working chamber 40.

Control of fluid from the reservoir 38 through inlets 42 in the pump plate 34 is performed by a rotatable control arm 44. The control arm 44 is drivingly secured to a shaft 46 projecting through an inner hub 47 formed in the cover 32. A well-known bimetallic coil 48 is connected to and rotates the shaft 46 and control arm 44 in response to ambient air temperature. An increase in air temperature causes the coil 48 to expand, thereby rotating the shaft 46 and the control arm 44 to uncover the inlets 42 in the pump plate 34. Fluid travels from the reservoir 38 to the shear zone 24, thereby transmitting input torque from the clutch plate 16 to the housing 22 and the attached fan 28. When the air temperature has decreased to a predetermined level, the coil 48 contracts, causing the shaft 46 and control arm 44 to rotate back to their original positions, thereby covering the inlets 42 and blocking fluid flow from the reservoir 38.

Fluid is returned from the shear zone 24 to the reservoir 38 through well-known discharge ports (not illustrated) provided in the pump plate 34 radially outbound of the inlets 42. Fluid return channels 50 formed in an inner surface of the cover 32 receive fluid as it passes through the discharge ports and guides the fluid back to the reservoir 38. The fluid return channels 50 can be formed like the fluid return channels described in U.S. Pat. No. 5,113,987, issued May 19, 1992, assigned to the present assignee, and hereby incorporated by reference.

The rear surface of the housing 22 includes a preferably annular groove 51 radially outbound of the lands 20. Groove 51 receives a complementary annular flange 52 provided on the inner surface of the cover 32 radially outward of the fluid return channels 50. When assembled, the flange 52 fits into the groove 51 and forms a labyrinth seal to prevent leakage of fluid from the clutch 10.

The cover 32 includes an annular wall 54 which is fitted to an outer circumference of the housing 22. A portion 56 of the wall 54 extends axially past the housing 22 and is staked or spun over to retain the cover 32 onto the housing 22.

Figure 2:
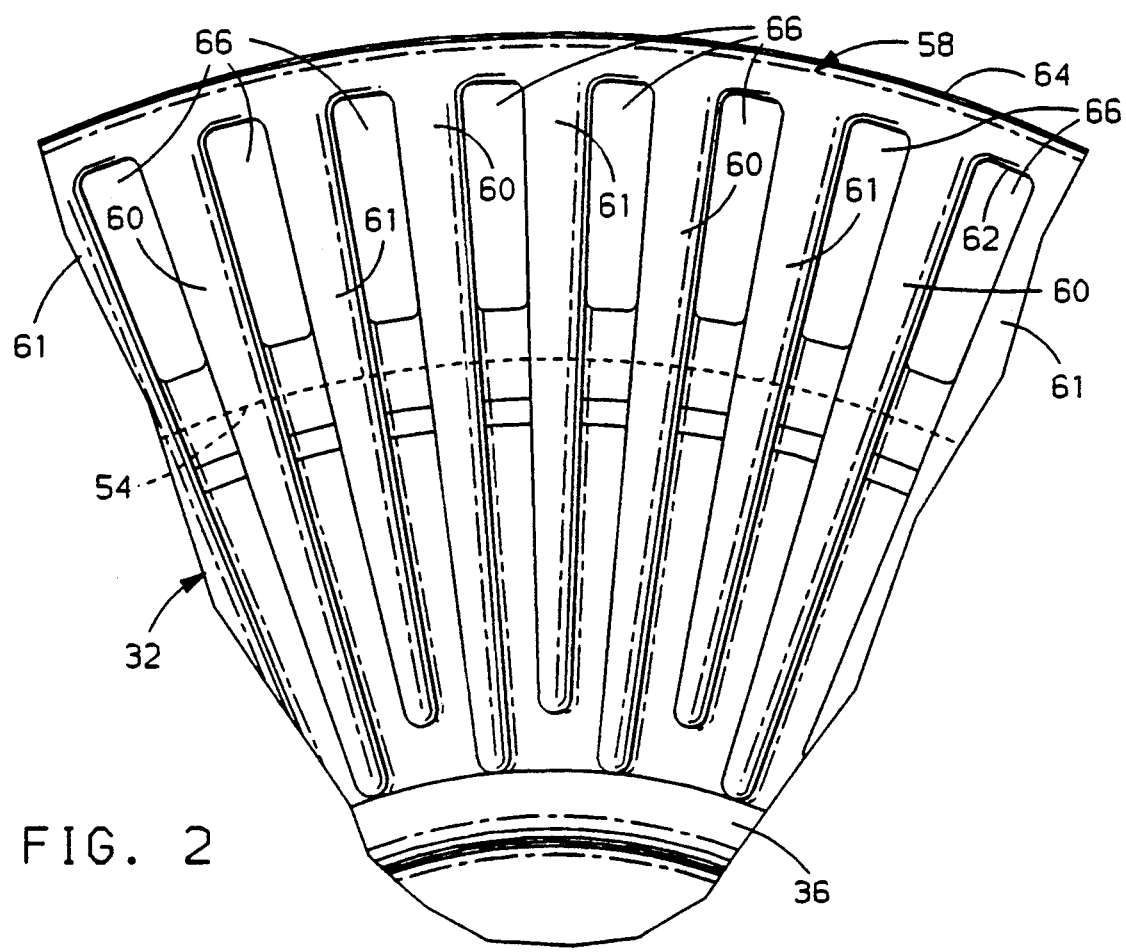
FIG. 2 is a partial end view of the present cover illustrating cooling passages between adjacent fins.

An outer airflow ring or shroud 58 is connected to the wall 54 by a plurality of fins 60 and 61, illustrated best in FIG. 2. Preferably the ring 58 is provided concentric with the wall 54 and includes an inner surface 62 and an outer surface 64. The cross section of each fin 60,61 can be profiled to enhance the passage of a cooling airflow A. Each fin 60,61 is arcuately spaced from an adjacent fin 60,61 in spoke-like fashion. A cooling passage 66 is formed between adjacent fins 60,61 and radially bounded by the wall 54 and the ring 58. The fins 60,61 can begin at (fins 60) or near (fins 61) an outer surface of the hub 36 and terminate at the inner surface of the ring 58. In other words, the ring 58 provides an outer gate for the fins 60,61. Such construction of the fins 60,61 and ring 58 permits a casting of the cover 32 and eliminates costly machining required in prior art covers to provide cooling passages between fins 60,61. During rotation of the clutch 10, air is directed through the cooling passages 66, thereby improving the rate of heat transfer and dissipation from fluid inside the clutch 10. Improved heat dissipation enhances the durability of the clutch 10.

Figure 4:
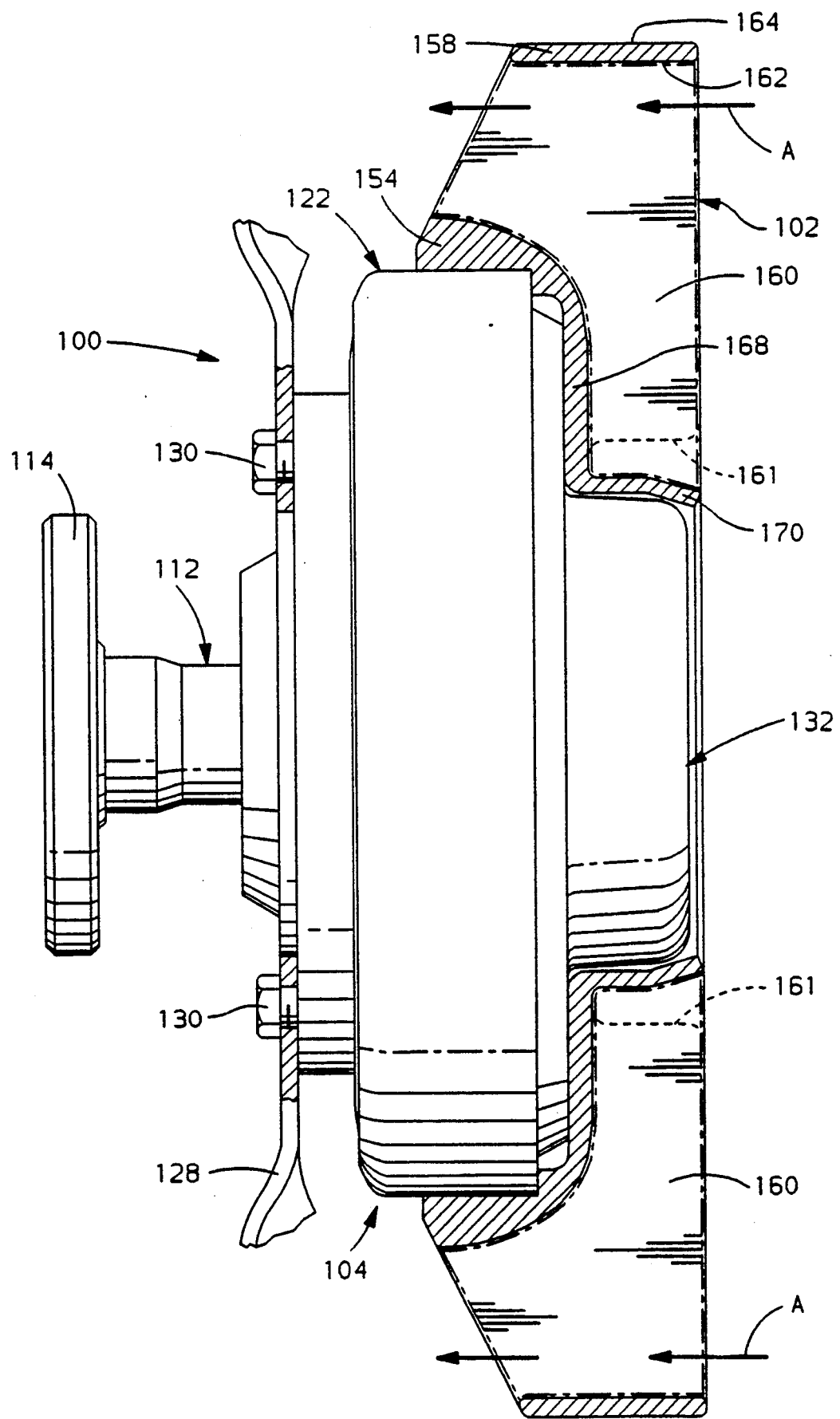
FIG. 4 is a sectional view of a second embodiment of the present airflow ring formed separately from a cover of a viscous fluid clutch.

A second embodiment 100 of the present invention includes a separately-formed airflow ring or shroud module 102 mounted on a conventional viscous fluid clutch 104 as illustrated in FIG. 4.

Figure 3:
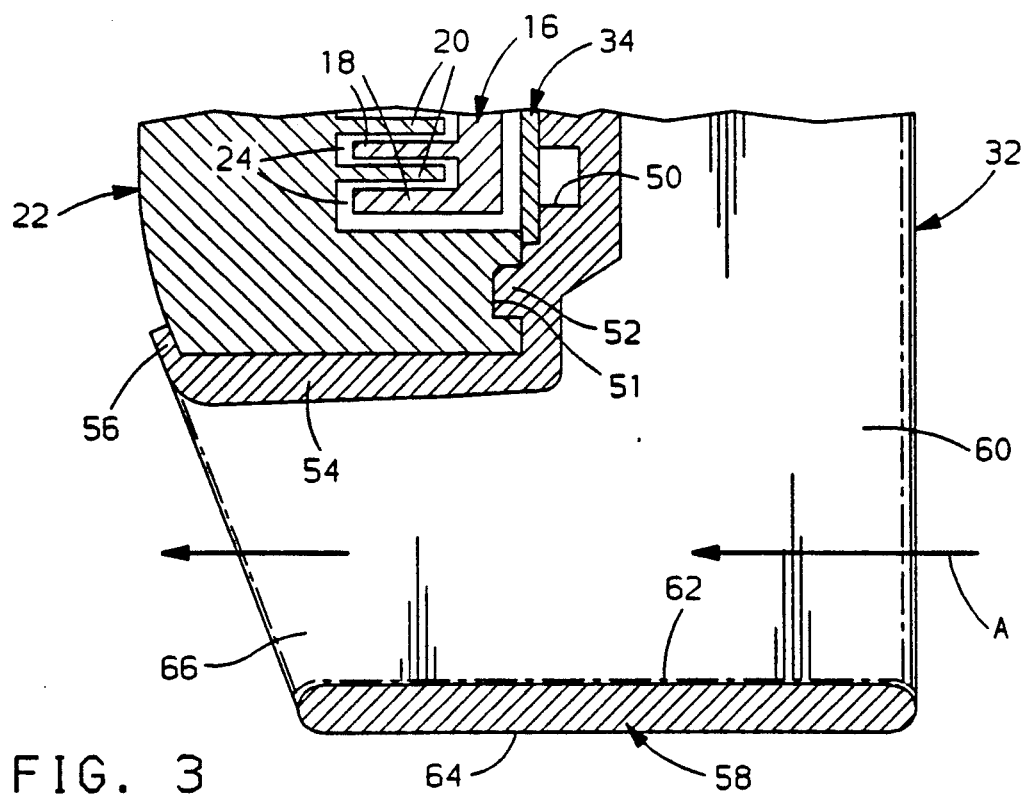
FIG. 3 is an enlarged sectional view of the labyrinth seal formed between the cover and housing of the clutch.

The clutch 104 includes elements similar to the embodiment illustrated in FIGS. 1–3 and well-known to those skilled in the art. An input shaft 112 extends from a rotatable housing 122. The input shaft 112 can terminate in a flange 114 which is typically secured to a water pump (not illustrated). A fan 128 is secured to the housing 122 by a plurality of threaded fasteners 130.

The housing 122 cooperates with a cover 132 to form an interior volume containing a viscous fluid, a clutch plate, a pump plate, and other elements similar to clutch 10. Fluid shear between the clutch plate and the housing 122 controls rotation of the housing 122 and the attached fan 128 in a conventional manner. As illustrated in FIG. 4, the outer surfaces of the housing 122 and cover 132 are smooth and free of conventional fins. In yet other embodiments of the present invention, various outer surfaces of the housing 122 and cover 132 can be provided.

The airflow ring module 102 is preferably an integrally formed member having an annular inner wall 154 and an outer airflow ring 158. A plate portion 168 is formed between the inner wall 154 and a central hub portion 170. The inner surfaces of the hub portion 170, plate portion 168, and inner wall 154 are formed to complement and receive the outer surfaces of the cover 132 and housing 122. The airflow ring module 102 is mounted to the clutch 104 by suitable means, including a press fit between the inner wall 154 and the outer surface of the housing 122.

The airflow ring 158 is attached to the inner wall 154 by a plurality of fins 160 and 161. Preferably the airflow ring 158 is provided concentric with the inner wall 154 and includes an inner surface 162 and an outer surface 164. The cross section of each fin 160,161 can be profiled to enhance the passage of a cooling airflow A. Each fin 160,161 is arcuately spaced from an adjacent fin 160,161 so that cooling passages are provided between fins 160,161, in a manner similar to cooling passages 66 illustrated in FIG. 2. Such construction of the airflow ring module 102 lends itself to casting and eliminates costly machining required in prior art attempts to provide cooling passages.

During rotation of the clutch 104, the cooling airflow A passes through the cooling passages between fins 160,161 to improve the rate of heat transfer and dissipation from fluid inside the clutch 104. Heat is first transferred from the fluid to the housing 122 and cover 132, and then dissipated by the airflow ring module 102. Preferably, the module 102 is cast from a selected material which enhances the transfer of heat from the clutch 104.

Although the present invention has been described with reference to preferred embodiments, workers skilled in the art will recognize that changes may be made in form and detail without departing from the spirit and scope of the invention. For example, in some applications, a partial ring may be more appropriate than a complete ring at the outer boundary of the fins.

The embodiments of the invention in which an exclusive property or privilege is claimed are defined as follows:

1. A viscous fluid coupling comprising:
   (a) a housing having inner and outer surfaces;
   (b) a cover, having inner and outer surfaces, cooperating with the housing to form a hollow interior;
   (c) a plate mounted between the housing and the cover to separate a fluid working chamber from a fluid reservoir;
   (d) a clutch plate rotatably disposed in the working chamber;
   (e) an input shaft drivingly connected to the clutch plate; and
   (f) a plurality of fins on the outer surface of the cover extending radially past the housing and terminating at attached ring means.

2. The coupling specified in claim 1 wherein the fins and ring means are integrally formed with the cover.

3. The coupling specified in claim 1 wherein the ring means, fins and cover are integrally cast.

4. The coupling specified in claim 1 wherein the fins and ring means are formed as a module separate from the cover and housing.

5. The coupling specified in claim 4 wherein the module is secured to the cover and housing.

6. The coupling specified in claim 1 wherein a passage for cooling airflow is formed between adjacent fins.

7. The coupling specified in claim 1 wherein each fin is profiled to enhance the passage of the cooling airflow.

8. The coupling specified in claim 1 including a labyrinth seal formed between the housing and the cover.

9. The coupling specified in claim 8 wherein the labyrinth seal is formed by an annular flange formed on the cover and fitted into a complementary groove in the housing.

10. The coupling specified in claim 1 wherein the cover includes an annular wall extending axially past the housing and spun over to retain the cover on the housing.

11. A viscous fluid coupling comprising:
(a) a housing having inner and outer surfaces;
(b) a cover, having inner and outer surfaces, cooperating with the housing to form a hollow interior;
(c) a plate mounted between the housing and the cover to separate a fluid working chamber from a fluid reservoir;
(d) a clutch plate rotatably disposed in the working chamber;
(e) an input shaft drivingly connected to the clutch plate; and
(f) an airflow ring module, having a plurality of fins extending radially past the housing, secured to one of the housing and the cover.

12. The coupling specified in claim 11 wherein the airflow ring module includes an annular inner wall secured to an airflow ring by the fins.

13. The coupling specified in claim 12 wherein the inner wall, airflow ring and fins are integrally formed.

14. The coupling specified in claim 11 wherein a passage for cooling airflow is formed between adjacent fins.

15. The coupling specified in claim 11 wherein each fin is profiled to enhance the passage of a cooling airflow.

16. A viscous fluid clutch comprising:
(a) a housing having inner and outer surfaces;
(b) a cover, having inner and outer surfaces, cooperating with the housing to form a hollow interior;
(c) a plate mounted between the housing and the cover to separate a fluid working chamber from a fluid reservoir;
(d) a clutch plate rotatably disposed in the working chamber;
(e) an input shaft drivingly connected to the clutch plate;
(f) a labyrinth seal between the housing and the cover formed by an annular flange on the cover extending axially toward the housing and fitted into a complementary groove in the housing to prevent leakage of fluid from the clutch; and
(g) a plurality of radial fins on the outer surface of the cover extending radially past the housing and bounded by attached ring means for directing a cooling airflow over the clutch.

17. The clutch specified in claim 16 wherein a passage for cooling airflow is formed between adjacent fins.

18. The clutch specified in claim 16 wherein the ring means, fins and cover are integrally formed.

19. A method of forming a viscous fluid clutch having a cover and a housing, comprising:
(a) forming a bowl-like cover having inner and outer surfaces;
(b) forming a housing;
(c) attaching the cover to the housing;
(d) integrally forming fins on the outer surface of the cover so that the fins extend radially beyond the housing; and
(e) forming a ring to the radially outermost ports of the fins.

20. The method specified in claim 19 including integrally forming the ring with the fins.

21. The method specified in claim 19 including circumferentially spacing each fin from an adjacent fin to form a cooling passage therebetween.

* * * * *